(12) United States Patent
Shi

(10) Patent No.: US 10,386,789 B2
(45) Date of Patent: Aug. 20, 2019

(54) HOLOGRAM DISPLAY APPARATUS AND HOLOGRAM DISPLAY METHOD

(71) Applicant: BOE TECHNOLOGY GROUP CO., LTD., Beijing (CN)

(72) Inventor: Bingchuan Shi, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/749,331

(22) PCT Filed: Jul. 11, 2017

(86) PCT No.: PCT/CN2017/092470
§ 371 (c)(1),
(2) Date: Jan. 31, 2018

(87) PCT Pub. No.: WO2018/049889
PCT Pub. Date: Mar. 22, 2018

(65) Prior Publication Data
US 2019/0011883 A1 Jan. 10, 2019

(30) Foreign Application Priority Data
Sep. 14, 2016 (CN) .......................... 2016 1 0826827

(51) Int. Cl.
G03H 1/12 (2006.01)
G03H 1/02 (2006.01)
(Continued)

(52) U.S. Cl.
CPC ................ *G03H 1/12* (2013.01); *G03H 1/02* (2013.01); *G03H 1/0841* (2013.01);
(Continued)

(58) Field of Classification Search
CPC ....................................... G03H 1/12
See application file for complete search history.

(56) References Cited

U.S. PATENT DOCUMENTS

RE29,461 E * 10/1977 Moriwaki ............. G06F 3/0321
359/25
9,591,297 B2 3/2017 Yu et al.
(Continued)

FOREIGN PATENT DOCUMENTS

CN 101202931 A 6/2008
CN 101477326 A 7/2009
(Continued)

OTHER PUBLICATIONS

First Office Action dated Aug. 1, 2017 in corresponding Chinese Patent Application No. 201610826827.7.
(Continued)

*Primary Examiner* — Rowina J Cattungal
(74) *Attorney, Agent, or Firm* — Nath, Goldberg & Meyer; Joshua B. Goldberg; Daniel Bissing

(57) ABSTRACT

A hologram display apparatus and a hologram display method are provided. The hologram display apparatus includes a controller and a display device. The controller is configured to obtain plural grayscale values $G_i$ of an image of a to-be-displayed object, generate plural display sub-image codes $Q_j$ according to the plurality of grayscale values $G_i$ and transmit the plurality of display sub-image codes $Q_j$ to the display device, where i=1, 2, ..., m, j=1, 2, ... N, each of m and N is a positive integer. The display device is configured to generate and display plural sub-holograms according to the plurality of display sub-image codes, a quantity of the plurality of sub-holograms being equal to that of the plurality of display sub-image codes, such that the plurality of sub-holograms are superimposed to generate a hologram of the image of the to-be-displayed object in human eyes.

10 Claims, 2 Drawing Sheets

(51) Int. Cl.
*G03H 1/08* (2006.01)
*G03H 1/22* (2006.01)

(52) U.S. Cl.
CPC ......... *G03H 1/2294* (2013.01); *G03H 1/2249* (2013.01); *G03H 2001/0212* (2013.01); *G03H 2001/0224* (2013.01); *G03H 2001/2284* (2013.01); *G03H 2001/2297* (2013.01); *G03H 2240/42* (2013.01)

(56) References Cited

U.S. PATENT DOCUMENTS

| | | | |
|---|---|---|---|
| 9,632,482 B2 * | 4/2017 | Lee | G03H 1/0808 |
| 2006/0171583 A1 | 8/2006 | Lee et al. | |
| 2013/0222384 A1 * | 8/2013 | Futterer | G02B 5/32 |
| | | | 345/426 |
| 2015/0277378 A1 * | 10/2015 | Smithwick | G03H 1/0808 |
| | | | 359/9 |
| 2017/0024890 A1 * | 1/2017 | Yoon | G03H 1/2294 |
| 2018/0063519 A1 * | 3/2018 | Smithwick | G02B 27/225 |

FOREIGN PATENT DOCUMENTS

| | | |
|---|---|---|
| CN | 101496405 A | 7/2009 |
| CN | 101661265 A | 3/2010 |
| CN | 101625874 B | 7/2011 |
| CN | 102654697 A | 9/2012 |
| CN | 103955127 A | 7/2014 |
| CN | 104464608 A | 3/2015 |
| CN | 105120325 A | 12/2015 |
| CN | 105892075 A | 8/2016 |
| CN | 106210707 A | 12/2016 |

OTHER PUBLICATIONS

International Search Report forms 210, 220, 237 dated Oct. 9, 2017 in corresponding International Application No. PCT/CN2017/092470 along with an English translation of the International Search Report and an English translation of the Written Opinion of the International Searching Authority.

* cited by examiner

HOLOGRAM DISPLAY APPARATUS AND HOLOGRAM DISPLAY METHOD

CROSS-REFERENCE TO RELATED APPLICATIONS

This is a National Phase Application filed under 35 U.S.C. 371 as a national stage of PCT/CN2017/092470, filed Jul. 11, 2017, an application claiming the benefit of Chinese Patent Application No. 201610826827.7, filed on Sep. 14, 2016, the contents of which are incorporated herein in their entirety by reference.

TECHNICAL FIELD

The present disclosure relates to the field of display technology, and in particular, relates to a hologram display apparatus and a hologram display method.

BACKGROUND

With the continuous development of display technology, a hologram display technology has become a branch of the display technology. The hologram display technology has attracted more and more attention due to the fact that the hologram display technology can provide all information that can satisfy the requirements of human visual sense, and a user can observe the information displayed by the hologram display technology without an auxiliary device such as a helmet, an eyewear, or the like.

SUMMARY

Embodiments of the present disclosure provide a hologram display apparatus and a hologram display method.

In one aspect, embodiments of the present disclosure provide a hologram display apparatus, which includes a controller and a display device, wherein the controller is configured to obtain a plurality of grayscale values $G_i$ of an image of a to-be-displayed object, generate a plurality of display sub-image codes $Q_j$ according to the plurality of grayscale values $G_i$, and transmit the plurality of display sub-image codes $Q_j$ to the display device, where i=1, 2, . . . , m, j=1, 2, . . . N, each of m and N is a positive integer; and the display device is configured to generate and display a plurality of sub-holograms according to the plurality of display sub-image codes, a quantity of the plurality of sub-holograms being equal to that of the plurality of display sub-image codes, such that the plurality of sub-holograms are superimposed to generate a hologram of the image of the to-be-displayed object in human eyes.

In an embodiment, the controller is further configured to determine a maximal value N of a quantity of digits according to a predetermined numeral system of base x and the plurality of grayscale values $G_i$, divide each of the plurality of grayscale values into N digits and N weights, generate corresponding N weight groups according to the N digits, and generate corresponding N display sub-image codes according to the N weight groups, wherein, the N digits and the N weights of each of the plurality of grayscale values have a one-to-one correspondence to each other, and each of the N weight groups corresponds to a respective one of the N digits.

In an embodiment, the controller is further configured to determine a maximal grayscale value $G_{max}$ according to the plurality of grayscale values $G_i$, and determine the maximal value N of the quantity of the digits according to maximal grayscale value $G_{max}$, N meeting the requirement of $\log_x G_{max} < N \leq (\log_x G_{max})+1$.

In an embodiment, the display device includes a spatial light modulator and a backlight assembly, wherein the backlight assembly is configured to provide corresponding N backlight intensities according to the N display sub-image codes, and the N backlight intensities are the digits corresponding to the weight groups corresponding to the N display sub-image codes, respectively; and the spatial light modulator is configured to generate corresponding N display sub-images according to the N display sub-image codes, and generate N sub-holograms according to the N display sub-images and the N backlight intensities and display the N sub-holograms in a time-division manner.

In an embodiment, the controller is further configured to obtain, according to a preset image of the to-be-displayed object, the plurality of grayscale values $G_i$ of the image of the to-be-displayed object.

In an embodiment, the hologram display apparatus further includes an image acquirer, the image acquirer is configured to acquire an image of the to-be-displayed object, and transmit the image of the to-be-displayed object to the controller, and the controller is configured to obtain the plurality of grayscale values $G_i$ according to the image of the to-be-displayed object.

In another aspect, embodiments of the present disclosure further provide a hologram display method, which is implemented by a hologram display apparatus including a controller and a display device, the hologram display method including steps of S1: obtaining, by the controller, a plurality of grayscale values $G_i$ of an image of a to-be-displayed object, generating, by the controller, a plurality of display sub-image codes $Q_j$ according to the plurality of grayscale values and transmitting, by the controller, the plurality of display sub-image codes $Q_j$ to the display device, where i=1, 2, . . . , m, j=1, 2, . . . , N, each of m and N is a positive integer; and S2: generating and displaying, by the display device, a plurality of sub-holograms according to the plurality of display sub-image codes, a quantity of the plurality of sub-holograms being equal to that of the plurality of display sub-image codes, such that the plurality of sub-holograms are superimposed to generate a hologram of the image of the to-be-displayed object in human eyes.

In an embodiment, the step S1 includes steps of:

S11: determining a maximal value N of a quantity of digits according to a predetermined numeral system of base x and the plurality of grayscale values $G_i$, and dividing each of the plurality of grayscale values into N digits and N weights, wherein, the N digits and the N weights of each of the plurality of grayscale values have a one-to-one correspondence to each other;

S12: generating corresponding N weight groups according to the N digits, wherein each of the N weight groups corresponds to a respective one of the N digits; and S13: generating corresponding N display sub-image codes according to the N weight groups.

In an embodiment, the step S11 includes steps of: determining a maximal grayscale value $G_{max}$ according to the plurality of grayscale values $G_i$, and determining the maximal value N of the quantity of the digits according to maximal grayscale value $G_{max}$, wherein N meets the requirement of $\log_x G_{max} < N \leq (\log_x G_{max})+1$.

In an embodiment, the step S2 includes steps of:

generating, by the display device, corresponding N display sub-images according to the N display sub-image codes, and providing, by the display device, corresponding N backlight intensities, wherein the N backlight intensities are the digits corresponding to the weight groups corresponding to the N display sub-image codes, respectively; and generating, by the display device, corresponding N sub-holograms according to the N display sub-images and the N backlight intensities, and displaying, by the display device, the N sub-holograms in a time-division manner.

In an embodiment, the step S1 includes step of:

obtaining, by the controller, according to a preset image of the to-be-displayed object, the plurality of grayscale values $G_i$ of the image of the to-be-displayed object.

In an embodiment, the step S1 includes step of:

acquiring, by an image acquirer included in the hologram display apparatus, an image of the to-be-displayed object, transmitting, by the image acquirer included in the hologram display apparatus, the image of the to-be-displayed object to the controller, and obtaining, by the controller, the plurality of grayscale values $G_i$ according to the image of the to-be-displayed object.

DETAILED DESCRIPTION

To make one of ordinary skill in the art better understand the technical solutions according to the present disclosure, a hologram display apparatus and a hologram display method provided by embodiments of the present disclosure will be described in detail below with reference to the accompanying drawings.

The inventor of the present disclosure has found that, in an existing hologram display apparatus, some information of an image of a to-be-displayed object will be lost, causing a hologram to have insufficient ability for grayscale rendering. As a result, a displayed hologram of the image of the to-be-displayed object will be distorted.

Figure 1:
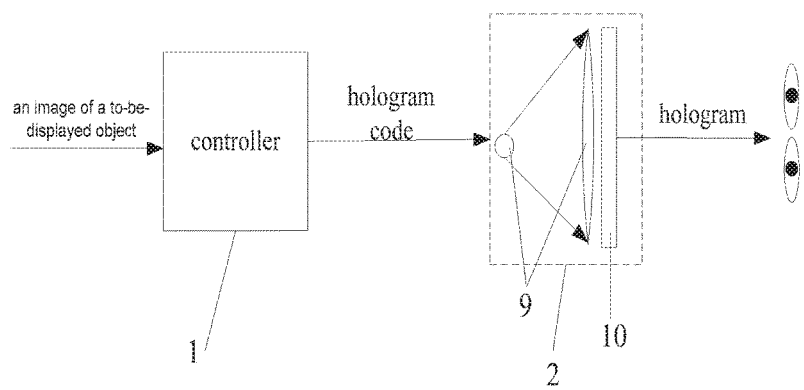
FIG. 1 is a schematic diagram showing a structure of a hologram display apparatus according to an embodiment of the present disclosure.

As shown in FIG. 1, an embodiment of the present disclosure provides a hologram display apparatus including a controller 1 and a display device 2. The controller 1 is configured to generate a hologram code according to an image of a to-be-displayed object, and transmit the hologram code to the display device 2. The display device 2 generates and displays a hologram according to the received hologram code.

The display device 2 may include a backlight assembly 9 and a spatial light modulator 10. The spatial light modulator 10 may display 256 gray levels. During the generating of a hologram code by controller 1, a single hologram generated and displayed by the display device 2 may have 256 gray levels or less. In a case where the quantity of the gray levels of a single hologram generated and displayed by the display device 2 may be less than 256, a resultant hologram may have insufficient ability for grayscale rendering. As a result, a displayed hologram of the image of the to-be-displayed object may be distorted.

Figure 2:
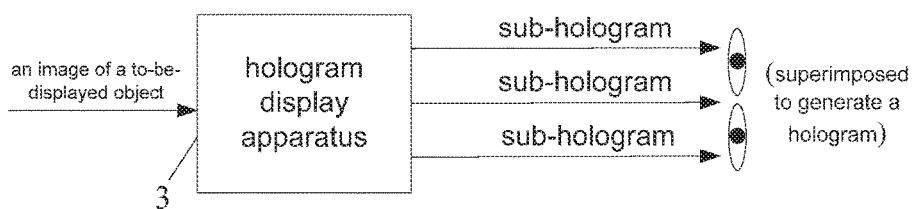
FIG. 2 is a schematic diagram showing the principle of hologram display according to some embodiments of the present disclosure.

Another embodiment of the present disclosure provides a hologram display apparatus 3, as shown in FIG. 2. The hologram display apparatus 3 can generate a plurality of sub-holograms according to an image of a to-be-displayed object, such that the plurality of sub-holograms may be superposed to generate a hologram of the image of the to-be-displayed object in human eyes. Compared to the hologram display apparatus which directly generates and displays one hologram for human eyes to observe, the hologram display apparatus 3 according to the present embodiment increases the gray levels of a hologram, thereby improving the hologram display effect.

Figure 3:
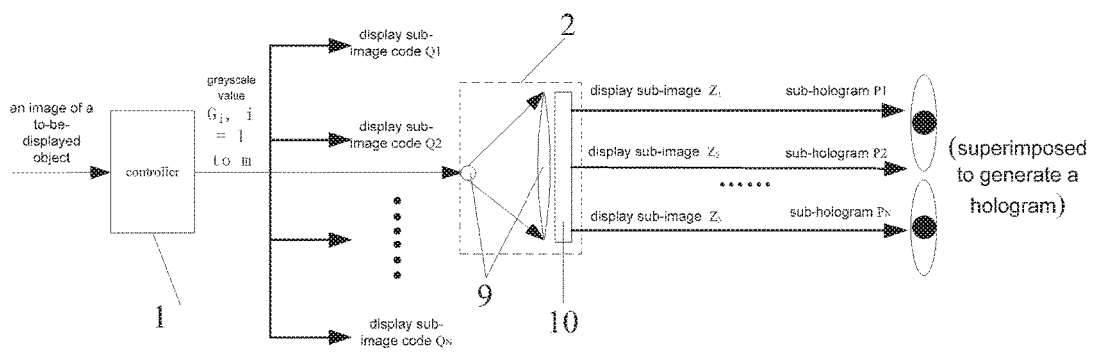
FIG. 3 is a schematic diagram showing a structure of a hologram display apparatus according to another embodiment of the present disclosure.

As shown in FIG. 3, the hologram display apparatus 3 includes a controller 1 and a display device 2. The controller 1 is configured to obtain a plurality of grayscale values $G_i$ (i=1, 2, . . . , m) of an image of a to-be-displayed object, generate a plurality of display sub-image codes $Q_j$ (j=1, 2, . . . , N) according to the plurality of grayscale values $G_i$, and transmit the plurality of display sub-image codes $Q_j$ to the display device 2. Each object point in the image of the to-be-displayed object corresponds to a sampling color denoted by a grayscale, i.e., each object point in the image of the to-be-displayed object corresponds to a grayscale value $G_i$, i being a serial number of each object point in the image of the to-be-displayed object, i=(1, 2, . . . , m), where m is a quantity of the object points in the image of the to-be-displayed object. That is, the controller 1 may obtain the grayscale values $G_i$ ($G_1, G_2, \ldots, G_m$) of the image of the to-be-displayed object, generate N display sub-image codes ($Q_1, Q_2, \ldots, G_N$) according to the grayscale values $G_i$ ($G_1, G_2, \ldots, G_m$), and transmit the N display sub-image codes ($Q_1, Q_2, \ldots, G_N$) to the display device 2. It should be noted that, each of m and N is a positive integer, and N may be less than or equal to m.

The display device 2 is configured to generate and display a plurality of sub-holograms ($P_1, P_2, \ldots, P_N$) according to the display sub-image codes ($Q_1, Q_2, \ldots, Q_N$), a quantity of the plurality of sub-holograms ($P_1, P_2, \ldots, P_N$) corresponding to that of the display sub-image codes ($Q_1, Q_2, \ldots, Q_N$), such that the plurality of sub-holograms ($P_1, P_2, \ldots, P_N$) are superimposed to generate a hologram of the image of the to-be-displayed object in human eyes.

In other words, the display device 2 generates and displays a corresponding quantity of sub-holograms ($P_1, P_2, \ldots, P_N$) according to the received N display sub-image codes ($Q_1, Q_2, \ldots, Q_N$), respectively. That is, the display device 2 generates and displays one sub-hologram according to one display sub-image code, and the N display sub-image codes ($Q_1, Q_2, \ldots, Q_N$) correspond to the N sub-holograms ($P_1, P_2, \ldots, P_N$), respectively. The N sub-holograms ($P_1, P_2, \ldots, P_N$) are displayed in a time-division manner within a time period of the visual persistence effect of human eyes, and thus may be superposed to generate a hologram of the image of the to-be-displayed object in the human eyes.

According to the present disclosure, the controller 1 obtains a plurality of grayscale values $G_i$ (i=1, 2, . . . , m) of an image of a to-be-displayed object, generates a plurality of display sub-image codes $Q_j$ (j=1, 2, ..., N) according to the plurality of grayscale values $G_i$, and the display device 2 generates and displays a plurality of sub-holograms $P_j$ (j=1, 2, ..., N), such that the plurality of sub-holograms $P_j$ (j=1, 2, ..., N) are superposed to generate a hologram of the image of the to-be-displayed object in human eyes. The gray levels of the hologram are the same as those of the image of the to-be-displayed object, and thus a displayed hologram of the image of the to-be-displayed object will not be distorted. As a result, the hologram will have enhanced ability for grayscale rendering, thereby increasing the hologram display effect of the image of the to-be-displayed object.

In an example, the controller 1 may be configured to determine the maximal value N of a quantity of digits according to a predetermined numeral system of base x and the grayscale values $G_i$, divide each of the grayscale values $G_i$ into N digits and N weights corresponding to the N digits, generate corresponding N weight groups ($H_1, H_2, \ldots, H_N$) according to the N digits, and generate corresponding N display sub-image codes according to the N weight groups (which will be further described below). The N digits of the grayscale values $G_i$ have a one-to-one correspondence to the N weights, and each of the weight groups corresponds to a single digit. In other words, the weights corresponding to a single digit belong to one weight group, as shown in Table 1 as described below.

In an example, the controller 1 may be configured to determine the maximal grayscale value $G_{max}$ according to the grayscale values $G_i$ ($G_1, G_2, \ldots, G_m$), and determine the maximal value N (N being a positive integer) of a quantity of digits according to the maximal grayscale value $G_{max}$ and a predetermined numeral system of base x, where N meets the requirement of $\log_x G_{max} < N \leq (\log_x G_{max})+1$. The predetermined numeral system of base x may be the binary system, the decimal system, or the like.

It should be noted that, the controller 1 may also first determine corresponding quantities of digits ($n_1, n_2, \ldots, n_m$) for respective ones of the obtained grayscale values $G_i$ ($G_1, G_2, \ldots, G_m$) according to a predetermined numeral system of base x, and then determine the maximal value N of the quantities of digits.

The controller 1 divides each of the grayscale values $G_i$ ($G_1, G_2, \ldots, G_m$) into N digits and N weights. Specifically, the grayscale values $G_i$ have N digits ($x^0, x^1, \ldots, x^{N-1}$) in common, a sum of the products of the digits $X_i$ and the weights $R_i$ corresponding to each of the grayscale values $G_i$ is equal to the grayscale value $G_i$. For example, in a case where i=1, the grayscale value $G_1$ may be divided into digits ($x^0, x^1, \ldots, x^{N-1}$) and weights ($R_1^0, R_1^1, \ldots, R_1^{(N-1)}$), the digit $x^0$ corresponds to the weight $R_1^0$, the digit $x^1$ corresponds to the weight $R_1^1$, and the digit $x^{N-1}$ corresponds to the weight $R_1^{(N-1)}$. Thus, the grayscale value $G_1 = x^0 * R_1^0 + x^1 * R_1^1 + \ldots + x^{N-1} * R_1^{(N-1)}$. In a case where i=2, the grayscale value $G_2$ may be divided into digits ($x^0, x^1, \ldots, x^{N-1}$) and weights ($R_2^0, R_2^1, \ldots, R_2^{(N-1)}$), and the grayscale value $G_2 = x^0 * R_2^1 + \ldots + x^{N-1} * R_2^{(N-1)}$. In a case where i=m, the grayscale value $G_m$ may be divided into digits ($x^0, x^1, \ldots, x^{N-1}$) and weights ($R_m^0, R_m^1, \ldots, R_m^{(N-1)}$) and the grayscale value $G_m = x^0 * R_m^0 + x^1 * R_m^1 + \ldots + x^{N-1} * R_m^{(N-1)}$.

Next, the controller 1 generates N weight groups ($H_1, H_2, \ldots, H_N$) according to the N digits ($x^0, x^1, \ldots, x^{N-1}$) wherein the weights in each of the N weight groups correspond to a single digit. That is, the N weight groups ($H_1, H_2, \ldots, H_N$) have a one-to-one correspondence to the N digits ($x^0, x^1, \ldots, x^{N-1}$) and each of the N weight groups includes m weights corresponding to a respective one of the N digits, as shown in Table 1 as shown below. Specifically, the weight group $H_1$ corresponds to the digit $x^0$, and the weights in the weight group $H_1$ correspond to the digit $x^0$, the weight group $H_1$ including the weights ($R_1^0, R_2^0, \ldots, R_m^0$). The weight group $H_2$ corresponds to the digit $x^1$, and the weights in the weight group $H_2$ correspond to the digit $x^1$, the weight group $H_2$ including the weights ($R_1^1, R_2^1, \ldots, R_m^1$). The weight group $H_N$ corresponds to the digit $x^{N-1}$, and the weights in the weight group $H_N$ correspond to the digit $x^{N-1}$, the weight group $H_N$ including the weights ($R_1^{(N-1)}, R_2^{(N-1)}, \ldots, R_m^{(N-1)}$).

The controller 1 generates N display sub-image codes ($Q_1, Q_2, \ldots, Q_N$) according to the N weight groups ($H_1, H_2, \ldots, H_N$) and the N weight groups have a one-to-one correspondence to the N display sub-image codes.

As shown in FIG. 3, the display device 2 may include a spatial light modulator 10 and a backlight assembly 9. The backlight assembly 9 is configured to provide corresponding N backlight intensities according to the N display sub-image codes ($Q_1, Q_2, \ldots, Q_N$), and the backlight intensities are the digits ($x^0, x^1, \ldots, x^{N-1}$) corresponding to the weight groups corresponding to the display sub-image codes ($Q_1, Q_2, \ldots, Q_N$). The spatial light modulator 10 is configured to generate N display sub-images according to the N display sub-image code ($Q_1, Q_2, \ldots, Q_N$), and generate and display corresponding N sub-holograms according to the N display sub-images and the backlight intensities ($x^0, x^1, \ldots, x^{N-1}$).

That is, the display device 2 receives the N display sub-image codes ($Q_1, Q_2, \ldots, Q_N$), and the backlight assembly 9 provides corresponding N backlight intensities according to the N display sub-image codes ($Q_1, Q_2, \ldots, Q_N$). In other words, the backlight assembly 9 provides the N backlight intensities, and the N backlight intensities have a one-to-one correspondence to the N display sub-image codes ($Q_1, Q_2, \ldots, Q_N$). The backlight intensities are the digits ($x^0, x^1, \ldots, x^{N-1}$) corresponding to the weight groups ($H_1, H_2, \ldots, H_N$) corresponding to the display sub-image codes ($Q_1, Q_2, \ldots, Q_N$).

The spatial light modulator 10 generates corresponding N display sub-images ($Z_1, Z_2, \ldots, Z_N$) according to the N display sub-image codes ($Q_1, Q_2, \ldots, Q_N$), and provides the N display sub-images ($Z_1, Z_2, \ldots, Z_N$) in a time-division manner. Meanwhile, the backlight assembly 9 provides the corresponding N backlight intensities ($x^0, x^1, \ldots, x^{N-1}$) in a time-division manner, so that each of the N display sub-images ($Z_1, Z_2, \ldots, Z_N$) is displayed with respective one of the N backlight intensities ($x^0, x^1, \ldots, x^{N-1}$), thereby forming N sub-holograms ($P_1, P_2, \ldots, P_N$) and displaying the N sub-holograms ($P_1, P_2, \ldots, P_N$) in a time-division manner.

Since the spatial light modulator may need to have a relatively high refresh frequency to display a plurality of sub-holograms in a time-division manner, a predetermined numeral system of base x and the maximal value N of a quantity of digits thereof may be determined according to an actual refresh frequency of the spatial light modulator, to ensure the plurality of sub-holograms to be regarded as one hologram by human eyes according to the visual persistence effect of the human eyes. The spatial light modulator 10 may include a liquid crystal display assembly, a digital micro-mirror array display assembly, or a silicon-based liquid crystal display assembly.

It should be noted that, the hologram display apparatus may directly display a hologram of a to-be-displayed object itself, or may display a hologram of an image of a to-be-displayed object. In a case of displaying a hologram of an image of a to-be-displayed object, the controller 1 may be provided with the image of the to-be-displayed object therein in advance, and may obtain a plurality of grayscale values $G_i$ according to the image of the to-be-displayed object provided in advance. In a case of directly displaying a hologram of a to-be-displayed object itself, the hologram display apparatus may further include an image acquirer (not shown), and the image acquirer is configured to acquire an image of the to-be-displayed object, and transmit the image of the to-be-displayed object to the controller 1 via wired or wireless communication. That is, the image acquirer may be coupled to the controller 1 via wired or wireless communication. The controller 1 may include a memory for storing the received image of the to-be-displayed object. Then, the controller 1 may obtain a plurality of grayscale values $G_i$ of the image of the to-be-displayed object.

The image acquirer may be a scanner or a digital camera. The hologram display apparatus that acquires an image of a to-be-displayed object itself in real time by using the image acquirer can realize synchronous and dynamic hologram display.

Figure 4:
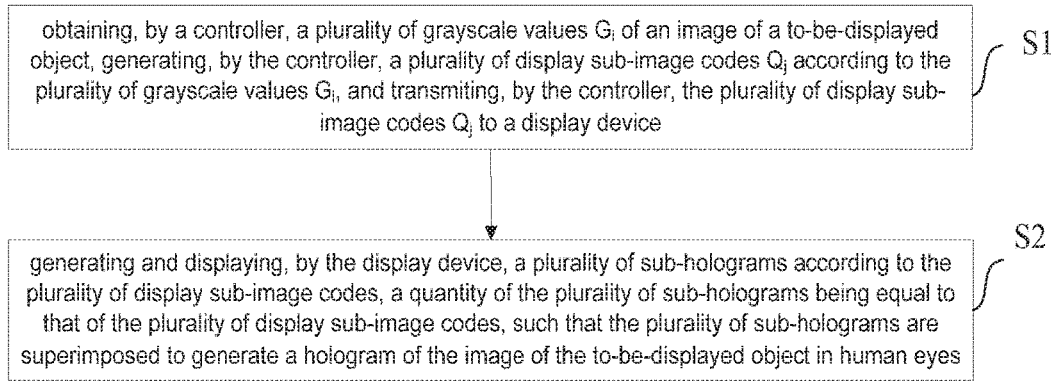
FIG. 4 is a schematic flowchart showing a hologram display method according to another embodiment of the present disclosure.

Similar to the concept of the hologram display apparatus according to the above embodiments, another embodiment of the present disclosure provides a hologram display method, as shown in FIGS. 3 and 4. The hologram display method may include the following steps S1 and S2.

At step S1, the controller obtains a plurality of grayscale values $G_i$ ($G_1, G_2, \ldots, G_m$) of an image of a to-be-displayed object, generates a plurality of display sub-image codes $Q_j$ ($Q_1, Q_2, \ldots, Q_N$) according to the grayscale values $G_i$ ($G_1, G_2, \ldots, G_m$), and transmits the display sub-image codes $Q_j$ ($Q_1, Q_2, \ldots, Q_N$) to the display device.

Specifically, according to a preset image of a to-be-displayed object, the controller may obtain a plurality of grayscale values $G_i$ ($G_1, G_2, \ldots, G_m$) of the image of the to-be-displayed object. Alternatively, the image acquirer of the controller may acquire an image of a to-be-displayed object, and transmit the image of the to-be-displayed object to the controller. Then the controller may obtain a plurality of grayscale values $G_i$ ($G_1, G_2, \ldots, G_m$) of the image of the to-be-displayed object.

An implementation in which the controller generates a plurality of display sub-image codes will be described below with reference to FIG. 5.

At step S2, the display device generates and displays a plurality of sub-holograms ($P_1, P_2, \ldots, P_N$) according to the display sub-image codes $Q_j$ ($Q_1, Q_2, \ldots, Q_N$), the quantity of the plurality of sub-holograms corresponding to that of the display sub-image codes, such that the sub-holograms ($P_1, P_2, \ldots, P_N$) are superposed to generate a hologram of the image of the to-be-displayed object in human eyes.

Specifically, the display device generates corresponding N display sub-images ($Z_1, Z_2, \ldots, Z_N$) according to the N display sub-image codes $Q_j$ ($Q_1, Q_2, \ldots, Q_N$), provides corresponding N backlight intensities ($x^0, x^1, \ldots, x^{N-1}$) according to the N display sub-image codes $Q_j$ ($Q_1, Q_2, \ldots, Q_N$), the backlight intensities being the digits corresponding to the weight groups ($H_1, H_2, H_N$) corresponding to the display sub-image codes $Q_j$ ($Q_1, Q_2, \ldots, Q_N$), and generates and displays corresponding N sub-holograms ($P_1, P_2, \ldots, P_N$) according to the N display sub-image codes $Q_j$ ($Q_1, Q_2, \ldots, Q_N$) and the N backlight intensities ($x^0, x^1, \ldots, x^{N-1}$).

From the above steps, it can be seen that, by generating and displaying the plurality of sub-holograms ($P_1, P_2, \ldots, P_N$), the plurality of sub-holograms ($P_1, P_2, \ldots, P_N$) are superposed to generate a hologram in human eyes, and the hologram has the same grayscale values as those of the image of the to-be-displayed object. That is, the hologram has the same gray levels as those of the image of the to-be-displayed object, thus the displayed hologram of the image of the to-be-displayed object will not be distorted.

Figure 5:
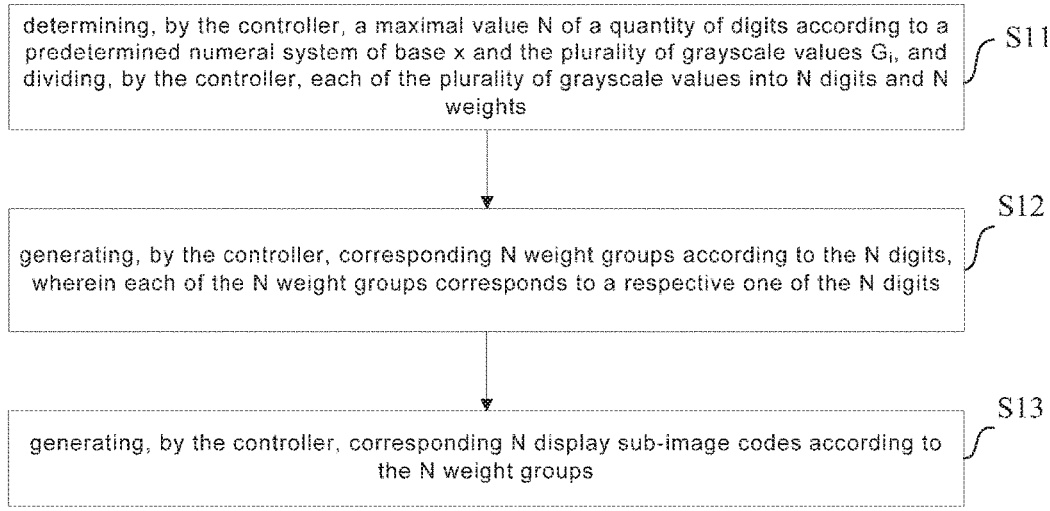
FIG. 5 is a schematic flowchart of forming display sub-image codes according to an embodiment of the present disclosure.

As shown in FIG. 5, the step at which the controller generates a plurality of display sub-image codes $Q_j$ ($Q_1, Q_2, \ldots, Q_N$) according to the grayscale values $G_i$ ($G_1, G_2, \ldots, G_m$) may include the following steps S11 to S13.

At step S11, the controller determines the maximal value N of a quantity of digits according to a predetermined numeral system of base x and the grayscale values $G_i$ ($G_1, G_2, \ldots, G_m$), and divides each of the grayscale values $G_i$ ($G_1, G_2, \ldots, G_m$) into the N digits and N weights, wherein the N digits and the N weights of the grayscale value $G_i$ have a one-to-one correspondence to each other.

Specifically, the controller 1 may determine the maximal grayscale value $G_{max}$ according to the grayscale values $G_i$ ($G_1, G_2, \ldots, G_m$), and determine the maximal value N (N being a positive integer) of the quantity of the digits according to the maximal grayscale value $G_{max}$ and the predetermined numeral system of base x, where N meets the requirement of $\log_x G_{max} < N \leq (\log_x G_{max}) + 1$.

At step S12, the controller generates N weight groups according to the N digits, wherein each of the N weight groups corresponds to a respective one of the N digits.

At step S13, the controller generates corresponding N display sub-image codes according to the N weight groups.

For better understanding of the technical solutions of the present disclosure, the hologram display apparatus and the hologram display method according to the above embodiments of the present disclosure will be further described below with a specific example and with reference to FIG. 3.

In the present embodiment, a case where the predetermined numeral system is a binary system and 5 grayscale values of an image of a to-be-displayed object are obtained is taken as an example, here, the 5 grayscale values are (0, 1, 2, 3, 4).

The controller 1 determines that the maximal grayscale value $G_{max}=4$, and calculates the maximal value N of a quantity of the digits as N=3 according to the formula $\log_2 4 < N \leq (\log_2 4) + 1$. Thus, each of the grayscale values (0, 1, 2, 3, 4) is divided into 3 digits and 3 weights corresponding to the 3 digits. Specifically, the grayscale value 0 is divided into digits (1, 2, 4) and weights (0, 0, 0), the grayscale value 1 is divided into digits (1, 2, 4) and weights (1, 0, 0), the grayscale value 2 is divided into digits (1, 2, 4) and weights (0, 1, 0), the grayscale value 3 is divided into digits (1, 2, 4) and weights (1, 1, 0), and the grayscale value 4 is divided into digits (1, 2, 4) and weights (0, 0, 1). The digits and the weights corresponding to the grayscale values are shown in the following Table 1.

TABLE 1

| Grayscale values | Digit = 4 ($2^2$) Weight group $H_3$ | Digit = 2 ($2^1$) Weight group $H_2$ | Digit = 1 ($2^0$) Weight group $H_1$ |
|---|---|---|---|
| 4 | 1 | 0 | 0 |
| 3 | 0 | 1 | 1 |
| 2 | 0 | 1 | 0 |
| 1 | 0 | 0 | 1 |
| 0 | 0 | 0 | 0 |

The grayscale values have the same digits of 1, 2, and 4. The controller 1 generates 3 weight groups ($H_1, H_2, H_3$). Each of the 3 weight groups ($H_1, H_2, H_3$) corresponds to a respective one of the digits, and includes 5 weights. Specifically, the weight group $H_1$ corresponds to the digit 1, and the weights in the weight group $H_1$ are (0, 1, 0, 1, 0) in the order from the minimal grayscale value to the maximal grayscale value. The weight group $H_2$ corresponds to the digit 2, and the weights in the weight group $H_2$ are (0, 0, 1, 1, 0) in the order from the minimal grayscale value to the maximal grayscale value. The weight group $H_3$ corresponds to the digit 4, and the weights in the weight group $H_3$ are (0, 0, 0, 0, 1) in the order from the minimal grayscale value to the maximal grayscale value.

The controller 1 generates corresponding 3 display sub-image codes ($Q_1$, $Q_2$, $Q_3$) according to the 3 weight groups ($H_1$, $H_2$, $H_3$). For example, the display sub-image code $Q_1$ may be (0, 1, 0, 1, 0), the display sub-image code $Q_2$ may be (0, 0, 1, 1, 0), and the display sub-image code $Q_3$ may be (0, 0, 0, 0, 1).

The spatial light modulator 10 of the display device 2 generates corresponding 3 display sub-images ($Z_1$, $Z_2$, $Z_3$) according to the 3 display sub-image codes ($Q_1$, $Q_2$, $Q_3$), and the backlight assembly 9 provides corresponding 3 backlight intensities according to the 3 display sub-image codes ($Q_1$, $Q_2$, $Q_3$), the backlight intensities being the digits (1, 2, 4) corresponding to the weight groups ($H_1$, $H_2$, $H_3$) corresponding to the display sub-image codes ($Q_1$, $Q_2$, $Q_3$). The spatial light modulator 10 provides the 3 display sub-images ($Z_1$, $Z_2$, $Z_3$) in a time-division manner, and the backlight assembly 9 provides the 3 backlight intensities (1, 2, 4) at the same time. Thus, the spatial light modulator 10 generates and displays the 3 sub-holograms ($P_1$, $P_2$, $P_3$) in a time-division manner.

The 3 sub-holograms ($P_1$, $P_2$, $P_3$) are superposed to generate a hologram in human eyes, wherein the grayscale values displayed in the hologram are equal to the grayscale values of the image of the to-be-displayed object, and are (0, 1, 2, 3, 4). Thus, the gray levels of the hologram are the same as those of the image of the to-be-displayed object, and thus the displayed hologram of the to-be-displayed object will not be distorted.

Advantageous technical effects of the present disclosure include at least the following.

In the hologram display apparatus and the hologram display method provided by the embodiments of the present disclosure, the controller is configured to obtain a plurality of grayscale values of an image of a to-be-displayed object, and generate a plurality of display sub-image codes according to the plurality of grayscale values. The display device is configured to generate and display a plurality of sub-holograms, such that the plurality of sub-holograms are superimposed to generate a hologram of the image of the to-be-displayed object in human eyes. The hologram has the same gray levels as those of the image of the to-be-displayed object, and thus the displayed hologram of the image of the to-be-displayed object will not be distorted. As a result, the hologram has enhanced ability for grayscale rendering, thereby increasing the hologram display effect of the image of the to-be-displayed object.

It should be understood that, the above embodiments are only exemplary embodiments for the purpose of explaining the principle of the present disclosure, and the present disclosure is not limited thereto. For one of ordinary skill in the art, various improvements and modifications may be made without departing from the spirit and essence of the present disclosure. These improvements and modifications also fall within the protection scope of the present disclosure.

What is claimed is:

1. A hologram display apparatus, comprising a controller and a display device, wherein
the controller is configured to obtain, according to a preset image of a to-be-displayed object, a plurality of grayscale values $G_i$ of an image of the to-be-displayed object, generate a plurality of display sub-image codes $Q_j$ according to the plurality of grayscale values $G_i$, and transmit the plurality of display sub-image codes $Q_j$ to the display device, where each point in the image of the to-be-displayed object corresponds to a grayscale value $G_i$, where i=1, 2, . . . , m, j=1, 2, . . . , N, wherein m is the quantity of object points and N is the number of the display sub-image codes; and
the display device is configured to generate and display a plurality of sub-holograms according to the numbers of the plurality of display sub-image codes, a quantity of the plurality of sub-holograms being equal to that of the plurality of display sub-image codes, such that the plurality of sub-holograms are superimposed to generate a hologram of the image of the to-be-displayed object in human eyes.

2. The hologram display apparatus according to claim 1, wherein the controller is further configured to determine a maximal value N of a quantity of digits according to a predetermined numeral system of base x and the plurality of grayscale values $G_i$, divide each of the plurality of grayscale values into N digits and N weights, generate corresponding N weight groups according to the N digits, and generate corresponding N display sub-image codes according to the N weight groups, wherein, the N digits and the N weights of each of the plurality of grayscale values have a one-to-one correspondence to each other, and each of the N weight groups corresponds to a respective one of the N digits.

3. The hologram display apparatus according to claim 2, wherein the controller is further configured to determine a maximal grayscale value $G_{max}$ according to the plurality of grayscale values $G_i$, and determine the maximal value N of the quantity of the digits according to maximal grayscale value $G_{max}$, N meeting the requirement of $\log_x G_{max} \leq (\log_x G_{max})+1$.

4. The hologram display apparatus according to claim 2, wherein the display device comprises a spatial light modulator and a backlight assembly;
the backlight assembly is configured to provide corresponding N backlight intensities according to the N display sub-image codes, and the N backlight intensities are the digits corresponding to the weight groups corresponding to the N display sub-image codes, respectively; and
the spatial light modulator is configured to generate corresponding N display sub-images according to the N display sub-image codes, and generate N sub-holograms according to the N display sub-images and the N backlight intensities and display the N sub-holograms in a time-division manner.

5. The hologram display apparatus according to claim 1, further comprising an image acquirer, wherein the image acquirer is configured to acquire an image of the to-be-displayed object, and transmit the image of the to-be-displayed object to the controller, and the controller is configured to obtain the plurality of grayscale values $G_i$ according to the image of the to-be-displayed object.

6. A hologram display method, implemented by a hologram display apparatus comprising a controller and a display device, the hologram display method comprising steps of
S1: obtaining, by the controller and according to a preset image of a to-be-displayed object, a plurality of grayscale values $G_i$ of an image of the to-be-displayed object, generating, by the controller, a plurality of display sub-image codes $Q_j$ according to the plurality of grayscale values and transmitting, by the controller, the plurality of display sub-image codes $Q_j$ to the display device, where each point in the image of the to-be-displayed object corresponds to a grayscale value $G_i$, where i=1, 2, ..., m, j=1, 2, ..., N, wherein m is the quantity of object points and N is the number of the display sub-image codes; and S2: generating and displaying, by the display device, a plurality of sub-holograms according to the numbers of the plurality of display sub-image codes, a quantity of the plurality of sub-holograms being equal to that of the plurality of display sub-image codes, such that the plurality of sub-holograms are superimposed to generate a hologram of the image of the to-be-displayed object in human eyes.

7. The hologram display method according to claim 6, wherein the step S1 comprises steps of:

S11: determining a maximal value N of a quantity of digits according to a predetermined numeral system of base x and the plurality of grayscale values $G_i$, and dividing each of the plurality of grayscale values into N digits and N weights, wherein, the N digits and the N weights of each of the plurality of grayscale values have a one-to-one correspondence to each other;

S12: generating corresponding N weight groups according to the N digits, wherein each of the N weight groups corresponds to a respective one of the N digits: and S13: generating corresponding N display sub-image codes according to the N weight groups.

8. The hologram display method according to claim 7, wherein the step S11 comprises steps of: determining a maximal grayscale value $G_{max}$ according to the plurality of grayscale values $G_i$, and determining the maximal value N of the quantity of the digits according to maximal grayscale value $G_{max}$, wherein N meets the requirement of $\log_x G_{max} \leq (\log_x G_{max})+1$.

9. The hologram display method according to claim 7, wherein the step S2 comprises steps of:

generating, by the display device, corresponding N display sub-images according to the N display sub-image codes, and providing, by the display device, corresponding N backlight intensities, wherein the N backlight intensities are the digits corresponding to the weight groups corresponding to the N display sub-image codes, respectively; and generating, by the display device, corresponding N sub-holograms according to the N display sub-images and the N backlight intensities, and displaying, by the display device, the N sub-holograms in a time-division manner.

10. The hologram display method according to claim 6, wherein the step S1 comprises step of:

acquiring, by an image acquirer comprised in the hologram display apparatus, an image of the to-be-displayed object, transmitting, by the image acquirer comprised in the hologram display apparatus, the image of the to-be-displayed object to the controller, and obtaining, by the controller, the plurality of grayscale values $G_i$ according to the image of the to-be-displayed object.

* * * * *